Patented June 24, 1930

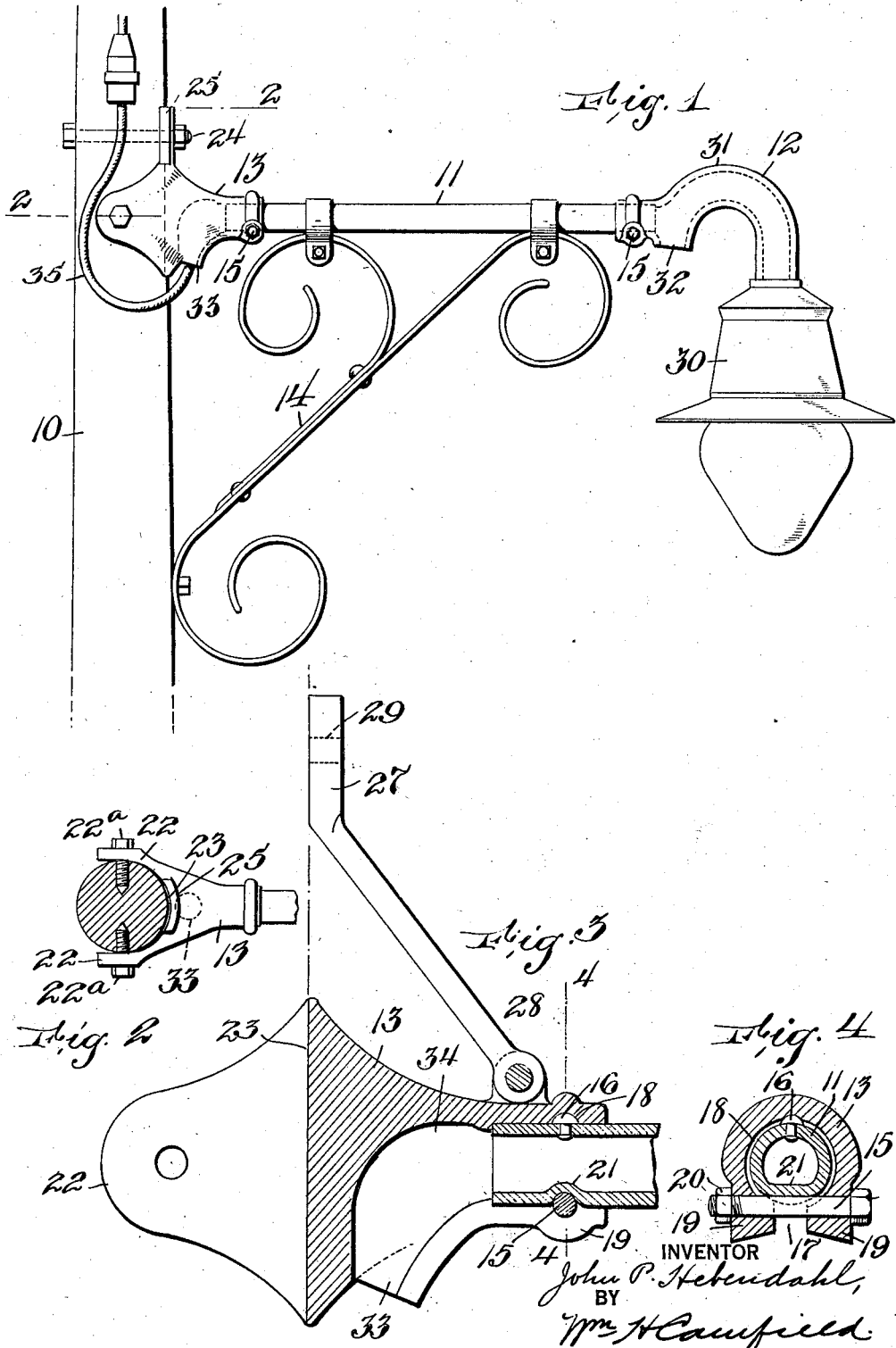

1,767,585

UNITED STATES PATENT OFFICE

JOHN P. HEBENDAHL, OF ELIZABETH, NEW JERSEY

BRACKET

Application filed April 3, 1929. Serial No. 352,074.

This invention relates to an improved bracket for supporting electric lights from poles and provides an arm which acts as a cover or conduit for the feed wire and also as a supporter for the bracket. The invention also provides joints for the parts which joints are tight against the entrance of water and also provides drainage openings to allow water that might get inside to escape, thus preventing short circuits, injury to the lamp by water and giving to the wire or cable a longer life as it is protected and kept dry.

The invention also relates to certain details of construction which will be more fully described hereinafter and finally embodied in the clauses of the claim.

The invention is illustrated in the accompanying drawings in which Figure 1 is a side view of a bracket embodying my invention. Figure 2 is a section on line 2—2 in Figure 1. Figure 3 is a vertical section of the clamp for affixing the bracket to a pole and showing the clamping means for the arm of the bracket. Figure 4 is a section on line 4—4 in Figure 3.

The pole is represented at 10 and the bracket comprises a tubular arm 11, the lamp suspending fixture 12, a clamp 13 to secure the bracket to the pole and a brace 14 usually of ornamental construction and which is secured to the arm and the pole.

The arm 11 is fastened to the fixture 12 and the clamp 13 by means of a bolt 15 which is secured in the split ends of the fixture and clamp as each fastening is the same. These elements, the fixture 12 and the clamp 13 are hollow and receive the ends of the arm 11. The arm has a rivet or other suitable head 16. The arm 12 is inserted with this head passing into the split part 17 until it reaches the annular groove 18. Then the arm is turned around until the head 16 is at the top. Then the bolt 15 is inserted and two flanges 19 on each side are forced inwardly when the nut 20 is screwed into place. The bolt 15 is tangential to and within the dimension of the arm 11. The arm is bent up as at 21 to receive the bolt 15 and the bolt when in place co-operates with the head 16 in holding the parts against turning relative to each other and again separation longitudinally.

The clamp 13 which is secured to the arm 11 in this manner is bifurcated comprises two curved arms 22 which embrace the pole 10 and are fastened by lag screws 22$^a$. The clamp can be fastened tightly against the pole at its curved part 23 but a slight clearance is usually left in order to allow the arm to be placed horizontal in case the pole 10 leans. The adjustment can be made by the placing of the bolt 24 which secures the plate 25 which extends from the centre of the clamp and opposite the pole. The adjustment can also be made as in Figure 3, in which case it has an arm 27 pivoted to the clamp 13 at 28 and held against the pole by a bolt through the hole 29.

The fixture 12 is secured to the outer end of the arm 11 and supports the lamp 30. The fixture 12 is usually of goose-neck form with the bend 31 and the straight portion which is fastened to the end of the arm 11 as previously described.

The curved part 31 prevents any accumulation or passage of water. In the old form of tightly closed screw-threaded brackets leakage is possible through the joints partly opened by the strains on the bracket. Water accumulates in these old forms, the water rots the insultion on the feed cable and the cable soon wears out and a short circuit results.

To prevent this I place a drainage opening at 32 which allows any water to escape from the outer end of the arm 11 and from the fixture 12 and I also provide a drainage opening in the clamp at 33 which allows water to escape from the inner end of the arm 11. This latter opening 33 also provides with the hollow part 34 of the clamp, a passage for the wire or cable 35 which passes through the arm 11 and fixture 12 to the lamp 30.

Various changes can be made without departing from the scope of the invention as defined in the claims.

I claim:—

1. A bracket comprising a tubular arm, means for supporting the arm from a pole, the arm including an inverted U-shaped fixture at the free end thereof for suspending a lamp, the fixture having a drainage opening at its inner end.

2. A bracket comprising a tubular arm, a tubular inverted U-shaped fixture at the end of the arm for supporting a lamp, the fixture including a straight portion for attachment to the arm, the fixture having a drainage opening in said portion.

3. A bracket comprising a tubular arm, a tubular inverted U-shaped fixture at the end of the arm for supporting a lamp, the fixture including a straight portion for attachment to the arm, the fixture having a drainage opening in said portion, a clamp for securing the arm to a pole, the clamp having a drainage opening communicating with the end of the arm thus also forming a passage for a cable.

4. A bracket comprising a tubular arm, a clamp for securing the arm to a pole, a gooseneck fixture secured to the end of the arm for suspending a lamp, a stud on each end of the arm, the fixture and the clamp each having an internal annular groove to receive the stud and having a split portion to hold the parts against separation.

5. A bracket comprising a tubular arm, a clamp for securing the arm to a pole, a gooseneck fixture secured to the end of the arm for suspending a lamp, a stud on each end of the arm, the fixture and the clamp each having an internal annular groove to receive the stud and having a split portion at that point, a bolt in each of said clamp and fixture and transversely arranged for contracting the split portion, the arm having a tangential recess to receive each bolt.

6. A bracket comprising an arm to support a lamp, a clamp to which the arm is secured, the clamp including two curved arms to embrace the pole, the arms having holes to receive bolts and on which bolts the clamp can swing for adjustment, and a plate extending vertically from the clamp and a bolt to secure the plate in position and whereby the angle of the clamp can be adjusted.

In testimony whereof I affix my signature.

J. P. HEBENDAHL.